(12) United States Patent
Maurer

(10) Patent No.: US 11,253,931 B2
(45) Date of Patent: Feb. 22, 2022

(54) COUPLING DEVICE

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 16/566,198

(22) Filed: Sep. 10, 2019

(65) Prior Publication Data
US 2020/0078872 A1 Mar. 12, 2020

(30) Foreign Application Priority Data

Sep. 10, 2018 (EP) ..................................... 18193443

(51) Int. Cl.
*B23B 31/16* (2006.01)
*B23B 31/28* (2006.01)

(52) U.S. Cl.
CPC ........ *B23B 31/16* (2013.01); *B23B 31/16283* (2013.01); *B23B 31/28* (2013.01); *G05B 2219/37225* (2013.01); *G05B 2219/50183* (2013.01); *Y10T 279/21* (2015.01); *Y10T 279/27* (2015.01)

(58) Field of Classification Search
CPC . B23B 31/101; B23B 31/16; B23B 31/16283; B23B 31/28; B23B 2260/128; B23Q 17/002; B23Q 17/003; B23Q 17/005; Y10T 279/1906; Y10T 279/21; Y10T 279/27; G05B 9/03; G05B 2219/37225; G05B 2219/50183
See application file for complete search history.

(56) References Cited

U.S. PATENT DOCUMENTS

| 4,536,000 A * | 8/1985 | Rohm | B23Q 17/005 |
| | | | 279/126 |
| 4,540,318 A * | 9/1985 | Hornung | B23Q 1/0009 |
| | | | 279/126 |
| 7,037,248 B2 * | 5/2006 | Takaku | B23Q 17/003 |
| | | | 29/593 |

(Continued)

FOREIGN PATENT DOCUMENTS

EP 3028804 6/2016

*Primary Examiner* — Eric A. Gates
*Assistant Examiner* — Chwen-Wei Su
(74) *Attorney, Agent, or Firm* — Pandiscio & Pandiscio

(57) ABSTRACT

A device (1) for controlling operation of a chuck (2), the device (1) comprising a chuck (2) for centering a workpiece (3) to be machined; at least one electric motor (6) connected to at least one moveable clamping jaw (4), the at least one movable clamping jaw (4) being configured to be selectively moved by the at least one electric motor (6); a first inductive transmission device; a second inductive transmission device (8) disposed in alignment with the first inductive transmission device (7) such that measurement signals and/or electric power are inductively transmitted between the first transmission device (7) and the second transmission device (8); and an external control device (11) by means of which command and monitoring data required for the operation of the at least one clamping jaw (4), and for the operation and locking of the electric motors (6) can be entered and/or read.

4 Claims, 3 Drawing Sheets

(56) References Cited

U.S. PATENT DOCUMENTS

| | | | | |
|---|---|---|---|---|
| 7,891,104 | B2* | 2/2011 | Muellner | B23Q 17/002 |
| | | | | 33/412 |
| 9,405,278 | B2* | 8/2016 | Stegmaier | G05B 19/0428 |
| 2004/0094910 | A1* | 5/2004 | Rehm | B23Q 17/005 |
| | | | | 279/126 |
| 2011/0006490 | A1* | 1/2011 | Puppala | B23B 31/1627 |
| | | | | 279/126 |
| 2016/0164305 | A1* | 6/2016 | Maurer | B23B 31/16045 |
| | | | | 320/108 |
| 2017/0339515 | A1* | 11/2017 | Masakawa | B23Q 7/04 |
| 2019/0116105 | A1* | 4/2019 | Steiner | H04L 43/08 |

* cited by examiner

COUPLING DEVICE

REFERENCE TO PENDING PRIOR PATENT APPLICATION

This patent application claims benefit of European Patent Application No. 18 193 443.1, filed Sep. 10, 2018, which patent application is hereby incorporated herein by reference.

FIELD OF THE INVENTION

The invention refers to a coupling device, in particular for a man-machine interface for operating inductively operated chucks.

BACKGROUND OF THE INVENTION

Such a transmission arrangement, in particular for energy and/or signal transmission and for use in a machining centre or a turning and/or milling machine, can be found, for example, in EP 3 028 804 B1. Signals and voltages are transmitted inductively from a fixed machine frame to a rotating machining centre, in particular a chuck, both in the direction of the chuck and vice versa. The respective machining centres or chucks have components, in particular clamping jaws, which can be moved by an electric motor or which are supported movably in a chuck body. The electric motors are then switched off for safety reasons when a preset ACTUAL position is reached, the clamping jaws are locked by means of spring packs and mechanical friction brakes. The electric motors then compress the spring packs during the clamping process so that they apply the clamping force to the clamping jaws. After the electric motors are switched off, the mechanical friction brakes prevent the clamping jaws from slipping or loosening.

In addition, the positions of the clamping jaws must be permanently monitored during the machining process, because the clamping jaws lock a workpiece to be machined centered in space and if the position of one of the clamping jaws changes during the machining process, machining errors or even loosening of the clamped workpiece may occur. In order to be able to permanently monitor the corresponding operating states and positions of the clamping jaws or electric motors installed in the chuck body of the chuck, these components are assigned a plurality of measuring sensors which generate the corresponding measurement data and which are transmitted by these via the inductive transmission devices, which are designed in two parts, namely on the one hand in the rotating chuck and on the other hand in the fixed support frame. The two transmission devices must therefore be aligned so that the spatial separation of the two transmission devices allows the chuck to rotate and, at the same time, inductive transmission of measurement signals, measurement data and/or voltages for the operation of the electric motors can be transmitted.

Although such inductively operated transmission arrangements have proven themselves in practice, it has been found that each user of such machining centres uses different electrical devices, so that each application has to be reprogrammed according to customer requirements. The chuck therefore cannot be taken into operation directly; rather, time-consuming and complex programming work is required to set the interface between the chuck and a control device which is to be operated by a human being.

SUMMARY OF THE INVENTION

The problem addressed by the present invention is therefore to provide a coupling device of the aforementioned type, in particular for an inductively operated chuck, which ensures that complete operation of the chuck and its monitoring during a machining operation is achieved immediately after the coupling of the customer's existing control devices with the chuck, independently of the customer-specific electrical devices.

According to the invention, this problem is solved by the features of the characterizing clause of Patent Claim 1.

Further advantageous embodiments of the invention are described in the subordinate claims.

In that at least one programmable interface is provided between the second inductive transmission device and the control device, which interface is electrically connected to the second inductive transmission device and the control device, in that each interface has one or more command and control programs by means of which the chuck is set by the control device, in that a plurality of measuring sensors are provided which are assigned to the clamping jaws, electric motors and/or the chuck and by means of which their operating states are detected and are transmitted to the respective interface, in that a comparison between the actual data stored in the command programs and the measurement data determined by the measuring sensors takes place by means of the respective interface, and in that data records are generated by this comparison of the selected operating state of the chuck with an actual operating state, which are evaluated by the respective interface and forwarded to the control device of the chuck, the chuck jaws or the electric motors, the chuck can be connected to a customer-specific control device without programming effort and can be put into operation immediately, since the command data and monitoring values required for the control and monitoring of the chuck are transmitted from the interface both in the direction of the control device and in the direction of the chuck after its connection to the second inductive transmission device and the control device. Consequently, the chuck and the programmable interface can be assembled and interconnected accordingly by the manufacturer, and as soon as the chuck with the interface is delivered to the respective customer, the control unit can be connected to the respective interface, allowing the chuck to be put into operation immediately without the need for time-consuming and complex programming work or adaptation of the respective customer-specific control units to the supplied chuck.

The chuck, the clamping jaws and/or the electric motors, by which the respective clamping jaws are moved and fixed in their clamping position, are assigned a plurality of measuring sensors, by which the positions, the force profiles and/or other measuring data required for the operation of the chuck are permanently generated. Accordingly, the operating state of the chuck and its components is monitored and a measurement data record is generated which is forwarded to the interface by the two inductive transmission devices from the chuck or their respective measuring sensors. The interface processes and compares the measurement data records received with stored data records that correspond to the selected operating state of the chuck. If the measurement data records match the stored data records, the respective interface forwards this result to the control unit, so that the actual machining process can be enabled, because the chuck correctly centers the workpiece to be machined.

It is often necessary for the calibrations determined by the interfaces to be checked redundantly, so that it is particularly advantageous if a second interface is provided which generates measurement data records from the measuring sensors independently of the first interface and compares them with the stored command program. If the measurement data records determined by the two interfaces match, this information is transmitted to the control unit and the clamping condition of the chuck is checked accordingly and the machining process can be initiated.

The respective user of the coupling device in accordance with the present invention therefore only has to select via the control device which of the stored operating states is to be employed for the chuck used and which clamping force is to be exerted by the clamping jaws on the workpiece to be machined. Consequently, the user only has to select and adjust the clamping force. This means that the interface supplied by the chuck manufacturer can be connected to any customer's control device and communicate with it accordingly. The actual evaluations of the determined measurement results and the comparison of the stored data records with the actual operating state of the chuck are carried out exclusively in the interface.

BRIEF DESCRIPTION OF THE DRAWINGS

The drawings show a coupling device, which is explained in more detail below. In the drawings.

DETAILED DESCRIPTION OF THE PREFERRED EMBODIMENTS

Figure 1:
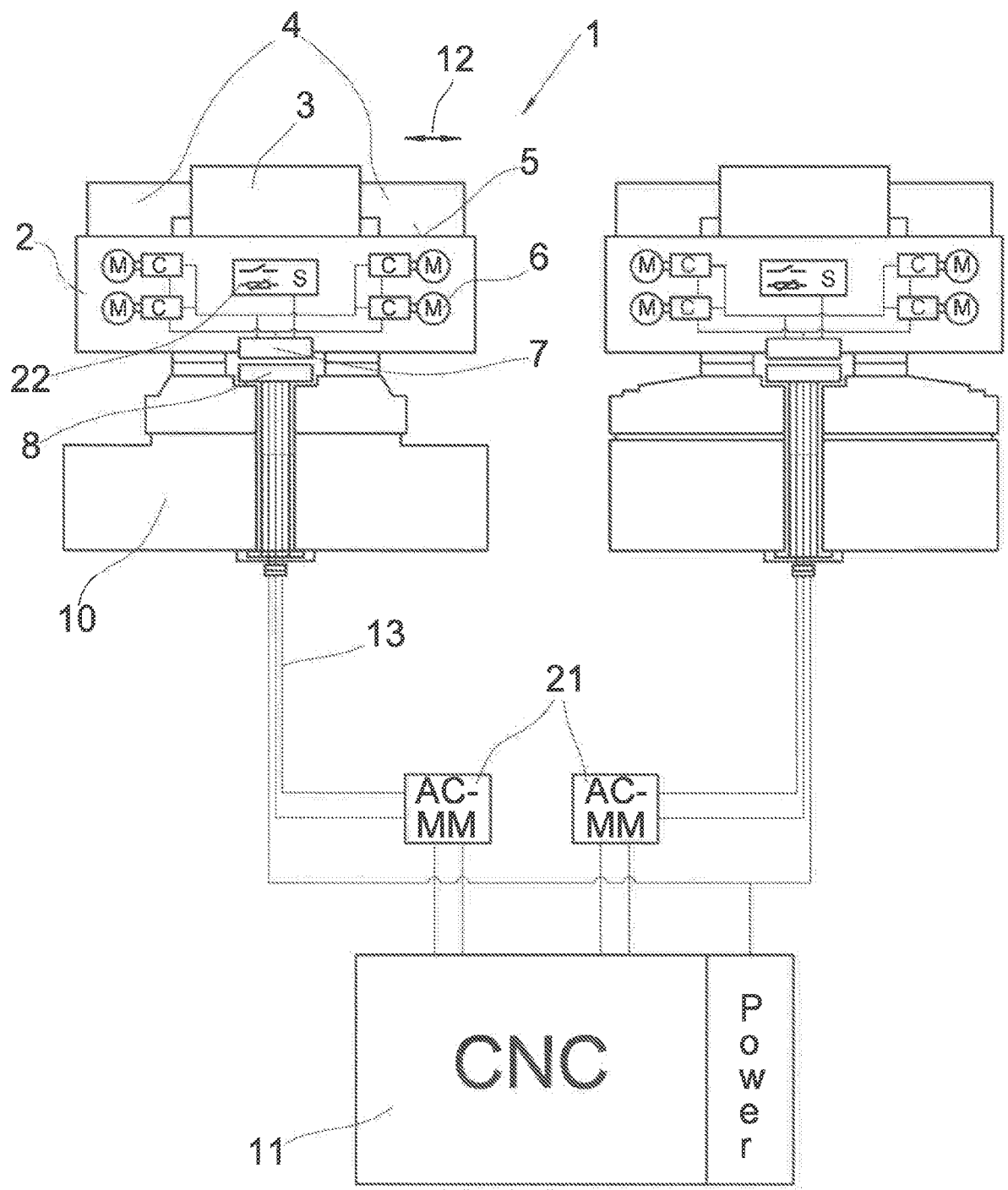
FIG. 1 shows a schematic representation of two chucks, each connected to a control unit via an interface.

FIG. 1 shows a coupling device 1 which is to be used to connect a chuck 2 to a control device 11 provided by the customer and to monitor it. The chuck 2 serves to keep a workpiece 3 to be machined centered in space while it is being machined by a machine tool that is not shown. The chuck 2 consists of one or more clamping jaws 4 which can be moved radially in the direction of the workpiece 3, so that the diameter which is enclosed or formed by the clamping jaws 4 can be changed in order to remove the workpiece 3 from the chuck 2 or to fix it in position. The clamping jaws 4 are held movably in guide grooves 5 and are each driven by an electric motor 6 assigned to them.

In order to supply the electric motor 6 with the necessary voltage, a first transmission device 7 is provided in the chuck 2, which is connected to the electric motors 6 and a plurality of measuring sensors 22 via electrical cables 13. The position of the clamping jaws 4 and the voltages of the electric motors 6 or their revolutions should be measured by the measuring sensors 22. Other measurement data required for the operation of the chuck 2 are also recorded by the measuring sensors 22 and forwarded to the first transmission device 7.

Since the chuck 2 rotates during the machining process, it must be spaced apart from a machine or support frame 10. The frame 10 is assigned a second transmission device 8, which is aligned with the first transmission device 7 of the chuck 2. This creates an air gap between the two transmission devices 7 and 8 so that the chuck 2 can be moved relative to the frame 10. Due to the inductive transmission between the two transmission devices 7, 8, the measurement data determined by the measuring sensors 22 as well as the voltages required for the operation of the electric motors 6 can be transmitted between them. The data records entered at the control unit 11 can also be passed on to the chuck 2.

The second transmission device 8 is connected to a programmable interface 21 via the electrical cables 13. The respective interface 21 is coupled to the control unit 11 via an electrical cable 13.

Figure 2:
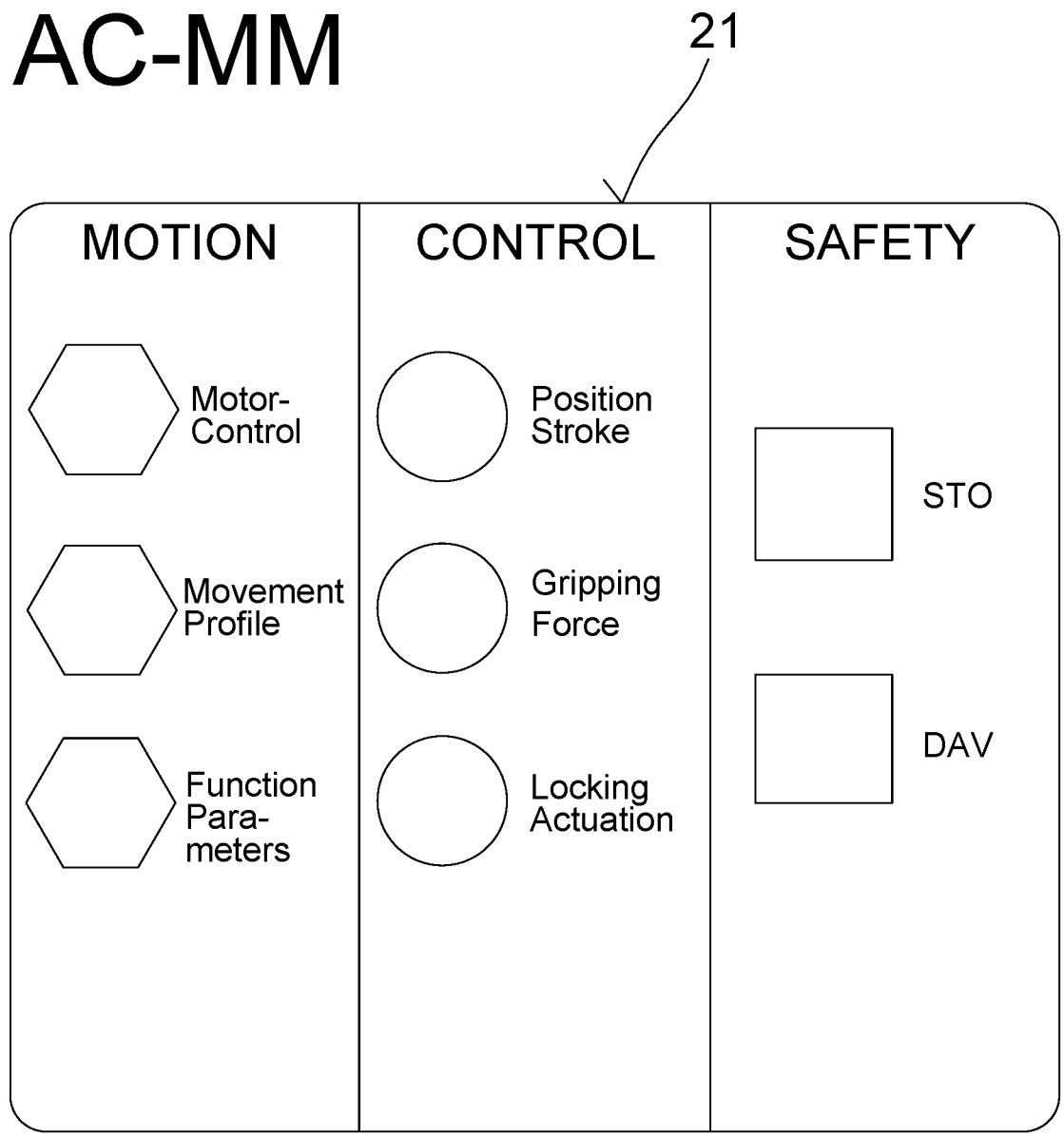
FIG. 2 shows an enlarged view of the interface as shown in FIG. 1.

FIG. 2 shows the schematic structure of the programmable interface 21. The interface 21 has several command levels, namely Motion, Control and Safety. These command levels are used to control and permanently monitor the chuck 2. In particular, the positions of the clamping jaws 4 and the voltages at the electric motors 6, which are permanently determined by the measuring sensors 22, are transmitted to the interface 21 and evaluated by it.

Several operating data records for the respective chuck 2 are stored in interface 21. The respective user selects one of the stored operating programs via control unit 11 and also sets the desired clamping force at control unit 11, which then transmits it via the interface 21 to the respective electric motors 6. Once these setting parameters have been selected or set, the electric motors 6 are activated by interface 21 so that the clamping jaws 4 move in the direction of the workpiece 3 to be machined. These motion states or sequences of the clamping jaws 4 and the electric motors 6 are stored in the Motion command level. If these sequences correspond to the stored data records, the interface 21 can determine that these motion sequences correspond to the stored motion sequences, which results in an initial safety release.

As soon as the clamping jaws 4 have reached their clamping position—which can be determined, for example, by an increase in the voltage at the electric motors 6 by the measuring sensors 22—the electric motors 6 must be switched off and fixed so that the clamping jaws 4 are no longer movable but rather locked. These operating states are stored in the control command levels and the measurement data permanently recorded by the measuring sensors 22 during the voltage state are compared with the stored measurement data in the respective interface 21. If there are no corresponding deviations between the stored data records of the operating state and the actual data records of the operating state, a further safety release takes place via interface 22 so that the machining process is not interrupted or can be released during the infeed movement of the clamping jaws 4.

In order to ensure monitoring of the function of the chuck 2 during the machining process, additional Safety command levels are provided in interface 21, which in particular monitor mechanical friction brakes. These friction brakes monitor the locking of the clamping jaws 4. The electric motors 6 are switched off when the clamping position is reached. During the clamping process, the electric motors 6 compress spring packs, which then exert a required clamping force on the clamping jaw 4. This means that these measurement data must also be recorded through the respective interface 21 and forwarded to the control unit 11.

The measurement data permanently determined by the measuring sensors 22 are compared in a stored operating state data record and as soon as a correspondingly specified deviation is present, the respective interface 21 generates a corresponding control signal, by means of which the machining process is interrupted by the control device 11. As long as the measurement data records received match the stored operating states in the form of corresponding data records, the machining process is not disturbed and can be continued.

Figure 3:
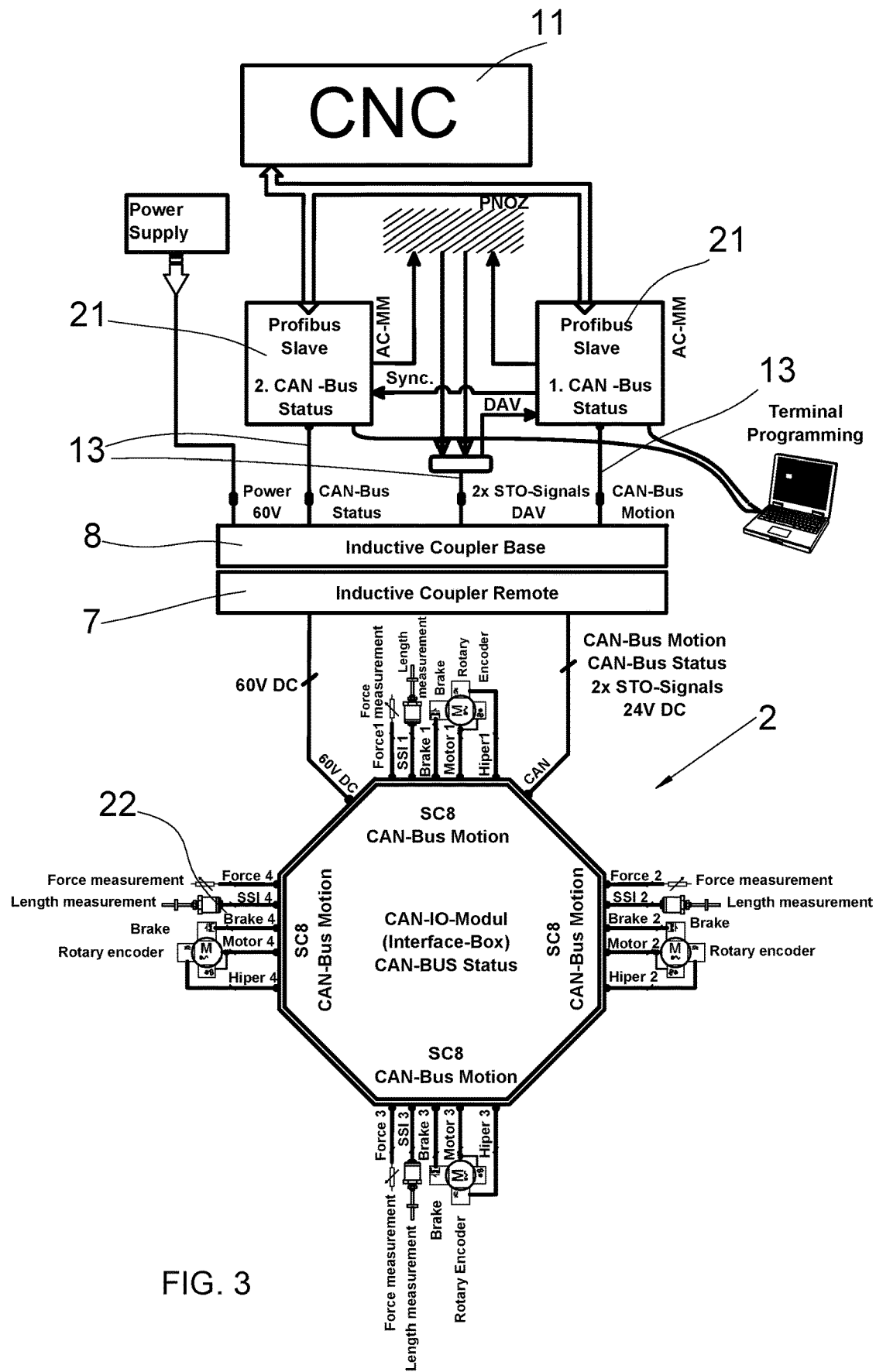
FIG. 3 shows a redundant check of the functionality of the interfaces as shown in FIG. 1.

FIG. 3 shows redundant monitoring of chuck 2, as two interfaces 21 are electrically coupled to the second inductive transmission device 8. Both of the interfaces 21 receive the measurement data records of the measuring sensors 22 independently of one another and evaluate them independently of one another. The two interfaces 21 are electrically connected to one another and as soon as the comparison between the received measurement data records and the stored operating states has been carried out, the interfaces 21 communicate with one another and if their measurement results or comparisons match, the control device 11 receives a release signal so that the machining process can be initiated because the chucks 2 are aligned in their clamping position.

However, if the measurement results or calibrations in the two interfaces 21 differ, the machining process must be interrupted or cannot be enabled, as there may be a malfunction on the chuck 2 or its clamping jaws 4 or electric motors 6. Such a malfunction must first be checked.

The two interconnected interfaces 21 therefore increase the safety for operation and the setting of the chuck 2, they therefore have a redundant function which increases safety. Both interfaces 21 work independently of one another and receive the measurement data determined by the measuring sensors 22.

What is claimed is:

1. A device (1) for controlling operation of an inductively operated chuck (2), the device (1) comprising:
    an inductively operated chuck (2) for centering a workpiece (3) to be machined in space using at least one movable clamping jaw (4);
    at least one electric motor (6) drivingly connected to the at least one moveable clamping jaw (4), the at least one electric motor (6) being mounted to the chuck (2), and the at least one movable clamping jaw (4) being configured to be selectively moved, or fixed against moving, by the at least one electric motor (6);
    a first inductive transmission device (7) mounted to the chuck (2);
    a frame (10) spatially separated from the chuck (2);
    a second inductive transmission device (8) mounted to the frame (10), such that the second inductive transmission device (8) is disposed in alignment with the first inductive transmission device (7) of the chuck, and such that the second inductive transmission device (8) is separated from the first inductive transmission device (7) by a gap of air, such that measurement signals and/or electric power are inductively transmitted between the first transmission device (7) and the second transmission device (8); and
    an external control device (11) by means of which command and monitoring data required for the operation and setting of the position of the at least one clamping jaw (4), and for the operation and locking of the electric motors (6) can be entered and/or read;
    wherein at least one programmable interface (21), is electrically connected to the second inductive transmission device (8) and the control device (11), with the at least one programmable interface (21) being disposed between the second inductive transmission device (8) and the control device (11);
    wherein the at least one programmable interface (21) comprises one or more command and control programs by means of which the operation of the at least one electric motor (6) and/or chuck (2) can be set or selected by the control device (11);
    wherein a plurality of measuring sensors (22) are assigned to at least one of (i) the at least one moveable clamping jaw (4), (ii) the at least one electric motor (6), and (iii) the chuck (2), and further wherein the plurality of measuring sensors (22) are configured to detect the operating states of the at least one clamping jaw (4), the at least one electric motor (6) and/or the chuck (2), and to generate one or more signals corresponding to data concerning the operating states of the at least one clamping jaw (4), the at least one electric motor (6) and/or the chuck (2);
    wherein the one or more signals generated by the plurality of measuring sensors are inductively transmitted from the first inductive transmission device (7) to the second inductive transmission device (8), and are transmitted from second inductive transmission device (8) to the at least one programmable interface (21); and
    wherein the at least one programmable interface (21) is configured to compare the data contained in the one or more signals generated by the plurality of measuring sensors (22) to predetermined data stored in the one or more command and control programs, whereby to generate data records which are evaluated by the at least one programmable interface (21) and forwarded to the control device (11);
    wherein the device comprises two programmable interfaces (21), and further wherein each of the two programmable interfaces (21) is configured to independently compare the data contained in the one or more signals generated by the plurality of measuring sensors to the predetermined data stored in the command and control programs, whereby to generate data records independently of one another which are evaluated by each of the two programmable interfaces (21) and forwarded to the control device (11).

2. The coupling device according to claim 1, wherein the interfaces (21) are interconnected, such that the data records generated by each of the two programmable interfaces (21) are compared with one another.

3. The coupling device according to claim 2, wherein a release to start the machining process or to deactivate the machining process is monitored by the two programmable interfaces (21) such that, in the event of a deviation in the data records between the two interfaces (21), the machining process is automatically interrupted.

4. The coupling device according to claim 1, wherein predetermined data relates to a movement and position of the at least one clamping jaw (4), an operating state of the at least one electric motor (6) and/or a clamping force applied by the clamping jaws (4), wherein the predetermined data are stored in the at least one programmable interface (21), and further wherein the predetermined data are compared with the data contained in the one or more signals generated by the plurality of measuring sensors (22), whereby to generate the data records.

* * * * *